Aug. 22, 1967  F. KESSELRING  3,337,827
PAWL OPERATED WHEEL MECHANISM FOR A SYNCHRONOUS SWITCH
Filed May 26, 1965  2 Sheets-Sheet 1

INVENTOR.
FRITZ KESSELRING
BY
OSTROLENK, FABER, GERB & SOFFEN
ATTORNEYS

Aug. 22, 1967  F. KESSELRING  3,337,827
PAWL OPERATED WHEEL MECHANISM FOR A SYNCHRONOUS SWITCH
Filed May 26, 1965  2 Sheets-Sheet 2

INVENTOR.
FRITZ KESSELRING
BY
OSTROLENK, FABER, GERB & SOFFEN
ATTORNEYS

United States Patent Office 3,337,827
Patented Aug. 22, 1967

3,337,827
PAWL OPERATED WHEEL MECHANISM FOR A SYNCHRONOUS SWITCH
Fritz Kesselring, Kusnacht, Zurich, Switzerland, assignor, by mesne assignments, to Siemens Aktiengesellschaft, Siemens-Schuckertwerke A.G., Berlin, Germany, a corporation of Germany
Filed May 26, 1965, Ser. No. 459,002
Claims priority, application Germany, May 29, 1964, S 91,308
8 Claims. (Cl. 335—191)

This invention relates to a novel operating mechanism for a synchronous switch, and more particularly relates to a novel operating mechanism wherein the angular momentum of a rotating mass is transferred to the movable contact of a pair of cooperating contacts to move the contact between its engaged and disengaged positions at predetermined times.

More particularly, rotatable pawl means which are operatively connected to the movable contact are moved into engagement with the surface of the rotating mass at predetermined times, thereby to connect the moving mass to the movable contact for moving it from the engaged position to the disengaged position, or from the disengaged position to the engaged position with respect to its stationary contact. The means for operating the engaging pawl is then formed of any suitable electromagnetic operating system, or the like, which can be energized, for example, from a circuit of the type which is operated immediately prior to a current zero value for circuit interruption, whereupon the cooperating contacts of the circuit interrupter will be operated immediately prior to the current zero value.

Arrangements are known where the periphery of a rotating mass had a gear-tooth impressed thereon, thereby to define a gear-rack. A suitable linkage was then provided from the movable contact to a gear-tooth which engaged the roating gear-rack at selected times in order to move the movable contact between its engaged and disengaged positions. When such an arrangement is used for synchronous circuit interruption wherein the operating mechanism must engage the rotating mass at a very specific time in order to achieve current zero interruption or interruption immediately prior to current zero, much difficulty is experienced if the gear-tooth is not in immediate proximity to the separation between two adjacent teeth on the rotating mass. That is to say, engagement with the rotating mass requires that there be an uncontrollable time delay until the engaging gear-tooth falls into the space between two teeth on the rotating mass. This causes difficulty in the timing of the separation of the cooperating contacts.

Further to this, it is necessary that there be additional time delay until the gear makes full or complete engagement with its cooperating gear rack before there is efficient transmission of power from the rotating mass to the movable contacts.

The principle of the present invention is to form the rotating mass as a body having a peripheral outer friction surface which engages a suitable pawl which is rotated into engagement with this friction surface when it is desired to connect the wheel to the movable contact system. By using a direct frictional connection, as contrasted to the gear-tooth connection of the above noted application, it will be clear that there will be an immediate mechanical connection between the rotating mass and the movable contact when the operating system moves the pawl into engagement with the rotating mass. Differently stated, the uncontrolled time delays due to the engagement of a gear-tooth and a cooperating gear rack are avoided by causing the direct frictional engagement between the rotating mass and a pawl which is connected to the movable contact.

In the embodiment of the invention, two such pawl connection mechanisms are provided between the rotating mass and the movable contact on opposite sides of the rotating mass. One of the pawls, when engaging the wheel, will move the movable contact toward its disengaged position while the other of the pawls will move the movable contact toward its engaged position. Two separate operating or control mechanisms are then provided for moving the pawls into engagement with the rotating mass at the desired times for contact operation.

Accordingly, a primary object of this invention is to provide an improved operating mechanism for synchronous circuit breakers.

Yet another object of this invention is to provide a novel operating mechanism for synchronous circuit breakers which improves the control of the time in which a rotating mass is operatively connected to the movable contact for moving the movable contact toward its disengaged position.

Still another object of this invention is to simplify the operating mechanism of a synchronous circuit breaker while improving the control of the time at which contacts are moved from their engaged or disengaged position toward the opposite position.

These and other objects of this invention will become apparent from the following description when taken in connection with the drawings, in which:

FIGURE 1 schematically illustrates the synchronous switch embodying the novel features of the present invention.

Figure 4:
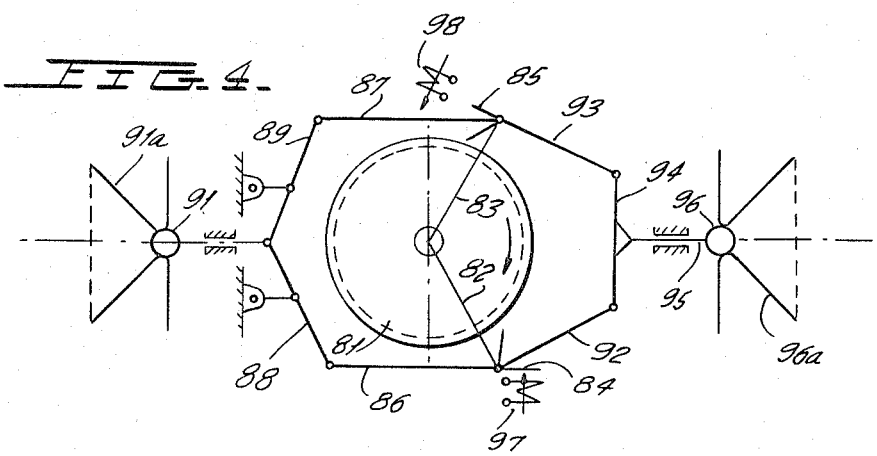

FIGURE 4 schematically illustrates the manner in which the novel mechanism of the present invention can be used for series connected breaks.

Figure 1:
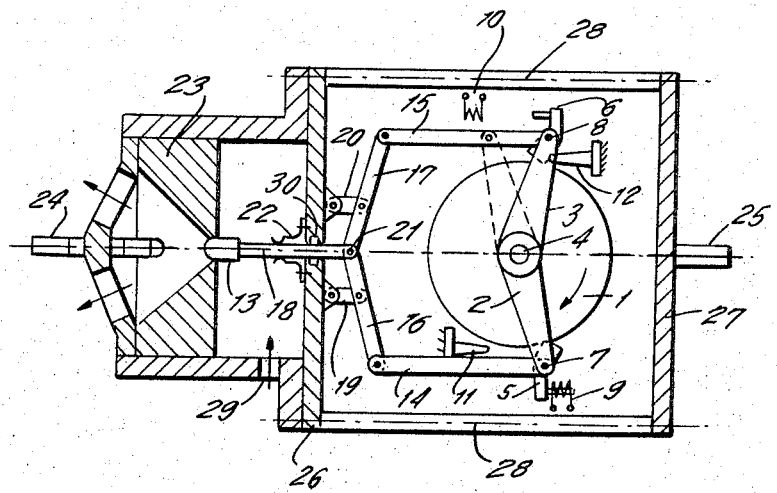
FIGURE 1a is a cross-section of a portion of the arrangement of FIGURE 1 to particularly illustrate the rotating mass in combination with the rotatable pawl at the top of the rotating mass in FIGURE 1.
Figure 1A:
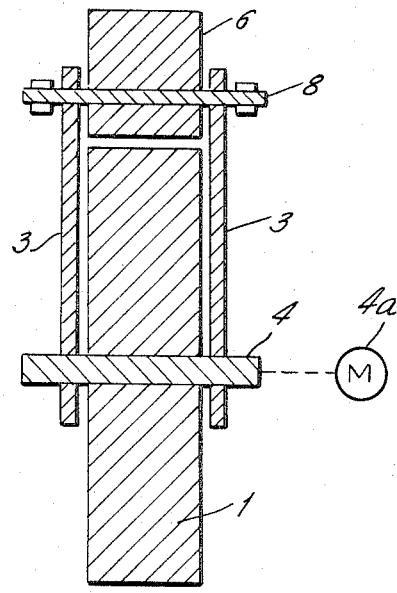

Referring now to FIGURES 1 and 1a, there is illustrated therein a rotating mass 1 which comprises a friction wheel which rotates in the clockwise direction shown by the arrow. Pairs of double levers 2 and 3 are then rotatably mounted on the shaft 4 which is directly connected to the wheel 1, and is operatively connected to some suitable source of driving power such as the schematically illustrated motor 4a, shown in FIGURE 1a. Note that FIGURE 1a only shows the levers 3 which straddle the wheel 1. Levers 2 will similarly straddle the wheel 1, but are not shown in FIGURE 1.

A pair of angularly shaped pawls 5 and 6 are then disposed at the ends of levers 2 and 3 and are pivotally connected at central regions to the ends of levers 2 and 3 on pivots 7 and 8, respectively. By way of example, in FIGURE 1a, the pawl 6 is shown pivotally mounted on the shaft 7 which is carried at the ends of levers 3. Each of pawls 5 and 6 have a normal position which is held, for example, by the use of springs to hold the pawls in the position generally shown in FIGURE 1 where their inner surfaces adjacent wheel 1 are out of engagement with the periphery of wheel 1.

A pair of magnetic trip systems diagrammatically illustrated in FIGURE 1 as magnetic systems 9 and 10 are then provided for the pawls 5 and 6, respectively, and are schematically illustrated as coils in which an electrical impulse can be impressed and which will generate a magnetic field which cooperates with suitable magnetic portions of pawls 5 and 6.

Thus, when winding or magnetic system 9 is energized, the pawl 5 will rotate counterclockwise about its support shaft 7 so that its upper surface will engage wheel 1. Similarly, when winding or magnetic system 10 is energized, the pawl 6 will rotate counterclockwise so that its lower engaging surface will engage the rotating wheel 1.

A pair of stop members 11 and 12 are then placed in fixed relation to the levers 2 and 3, respectively, and, as will be seen more fully hereinafter, serve to release the engagement between the pawls 5 and 6 and the wheel 1 after they have engaged the wheel and been moved in the direction of rotation of the wheel for a predetermined distance.

Pairs of side bars 14 and 15 then connect the ends of pairs of levers 2 and 3, respectively, to pairs of levers 16 and 17, respectively, in a pivotal manner. Levers 16 and 17 are then suspended on side bars 19 and 20, respectively, and are joined at the pivot connection 21. Thus, the pivot point 21 will necessarily move in the straight line indicated by the dot-dash line in the figure.

The movable contact of the circuit interrupter 18 then has its right-hand end directly connected to the pivot connection 21, and its left-hand end 13 defines the interrupting portion of the contact. The main elongated portion of contact 18 is in constant engagement with the spring clip contact schematically illustrated as the tulip clip 22 which is connected to the conductive plate 26, as will be later described.

The main stationary contact 23 then cooperates with the movable contact section 13 and has a central opening therein defining an orifice or nozzle through which high pressure gas may move during contact separation. The stationary contact 23 then has a suitable terminal 24 connected thereto. The other terminal of the circuit interrupter is comprised of the terminal connection 25 which is electrically connected to conductive plate 26 and thus contact rod 18 by suitable conductive bolts 28 which are connected between plates 26 and 27.

A sealed volume is defined between the right-hand surface of stationary contact 23 and the left-hand surface of plate 26 and the surrounding insulation housing 26a. An opening 29 is then formed in housing 26a to permit the introduction of a high pressure arc-quenching gas such as sulphur hexafluoride. A gasket 30 may be provided between the conductive rod 18 and the plate 26.

The operation of the system schematically illustrated in FIGURE 1 is as follows:

Assuming the switch is in the closed position with contact 13 engaging contact 23, and the magnetic system 9 is excited by some short-circuit impulse, or due to some short-circuit impulse, the pawl 15 will rotate counterclockwise about its axis 7, thereby engaging the outer periphery of the friction wheel or rotating mass 1 and locks into engagement with this surface.

As a result, levers 2 will immediately move along with the wheel 1 to the left in the figure with great force, being released from the wheel only when the upper surface of pawl 5 engages stop 11 and is pried away from the surface of wheel 1.

The motion of lever 14 to the left will cause lever 16 to rotate clockwise about its pivotal engagement with link 19 and will similarly cause the lever 17 to rotate counterclockwise about its pivotal connection with link 20. Therefore, pivot point 21 will move to the right along a substantially straight line, thereby moving contact rod 18 and contact 13 to the right and to a disengaged position with respect to stationary contact 23. Note that in this position the levers 3 will have moved to the dotted line position shown in the drawing.

As the contact 13, which forms a seal in the nozzle formed in stationary contact 23, moves to the right and toward a disengaged position, gas stored in the chamber communicating with opening 29 will blast through the opening in stationary contact 23, thereby assisting in the extinction of any arc which is formed between contacts 13 and 23.

In order to close the switch, the magnetic system 10 will be energized, whereupon the pawl 6 will rotate into engagement with wheel 1 to be moved to the right until it reaches the position shown where the pawl 6 engages the releasing stop 12 which pries pawl 6 away from wheel 1. However, the movement of the rod 15 to the right will cause the motion of contact rod 18 and movable contact 13 to the left, thereby to close the circuit between terminals 24 and 25.

As an example of the operating power available in such a system, it is possible to bring the rotating friction wheel 1 up to a speed of from 2,000 to 4,000 revolutions per minute just prior to the switching operation as by connecting the motor 4a of FIGURE 1a to shaft 4 just prior to the desired circuit operation. If the friction wheel has a radius $r$ and an axial width $b$, and if the angular velocity of the wheel is $W$, and the coefficient of friction of the wheel and pawls is $\mu$, then the kinetic energy available will be $$KE = \frac{\pi\mu}{4} \times b \times W^2 \times r^4$$

Thus, it will be seen that substantial amounts of kinetic energy can be obtained from this system.

Preferably, the kinetic energy in the rotating wheel 1 will be intentionally made to be 10 to 20 times larger than the kinetic energy which is translated to the movable contact system. This insures the possibility of performing several opening and closing operations without appreciably decreasing the angular momentum of wheel 1. Note that substantially any desired operating speed can be imparted to the movable contact 13 through the suitable selection of the various parameters for the rotating mass system along with the mechanical advantage available in the design of levers 16 and 17, whereby the speed of movable contact 13 can be made larger or smaller, as desired, than the peripheral speed of wheel 1.

Figure 2:
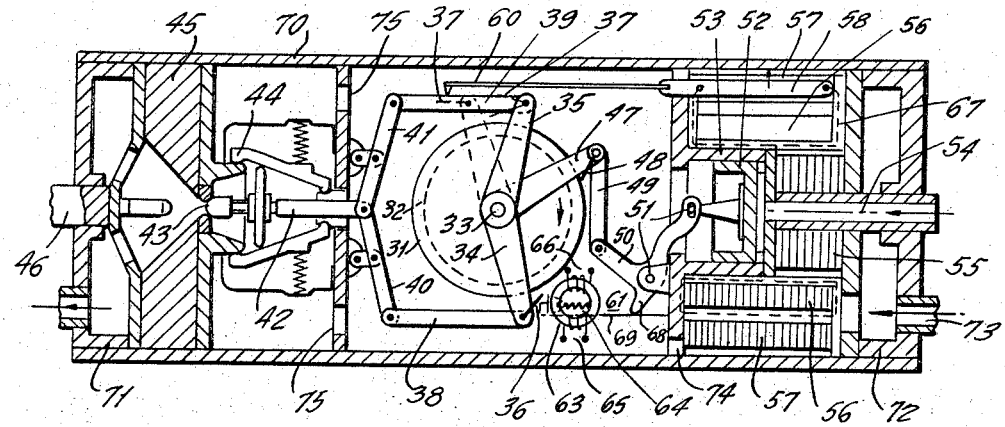
FIGURE 2 is a cross-sectional view of the complete circuit interrupter and illustrates the operating mechanism of the type shown in FIGURE 1 in connection with operating means for operating the pawls into engagement with the rotating mass.

Turning now to FIGURE 2, there is illustrated therein one manner in which the schematically illustrated system of FIGURE 1 can be applied to a synchronous circuit interrupter. That is to say, FIGURE 2 illustrates a manner in which the operating mechanism of FIGURE 1 is energized at preselected times within the current cycle of the current flowing between terminals 24 and 25 in FIGURE 1.

Figure 2A:
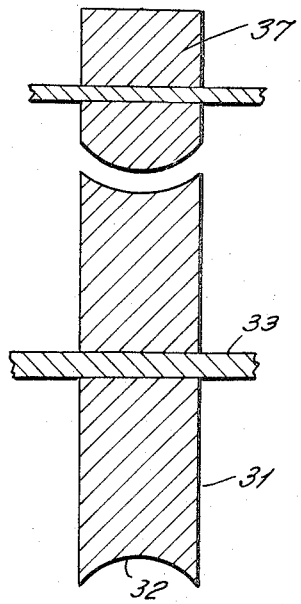
FIGURE 2a is a partial cross-section of the rotating mass of FIGURE 2 in combination with the upper rotating pawl, and illustrates a groove shape for the friction-engaging surface of the rotating mass of FIGURE 2.

Referring now to FIGURE 2, there is illustrated therein a rotating friction wheel or mass 31 which has a wedge-shaped notch 32 therein, best seen in FIGURE 2a, and is carried on an axis or shaft 33 which is connected to some suitable driving means. Similar to FIGURES 1 and 1a, a double levers 34 and 35 are provided in FIGURE 2 which are double levers carried on the shaft 33 and terminate in locking pawls 36 and 37, respectively. Pairs of levers 38 and 39 are then connected to the ends of double levers 34 and 35, and are pivotally connected to the movable contact rod 42 which has its left-hand end connected to the movable contact 43.

It will be noted that in FIGURE 2 the contact 43 is an arcing contact and is surrounded by a main contact structure 44 which will carry the main current through the circuit interrupting device.

The stationary contact 45 is then provided with a central outwardly spreading orifice which is normally sealed by the arcing contact 43, and which will direct the exhaust of the high pressure gas contained in the chamber surrounding contacts 43 and 44. A terminal conductor 46 is then suitably electrically connected to the stationary contact 45, as illustrated.

A pair of double levers 47 are then rotatably connected to shaft 35 in a manner identical to that described previously for double levers 34 and 35, and are provided with a locking pawl 48 similar to the locking pawls 36 and 37. As will be seen more fully hereinafter, the double lever 47 with the locking pawl 48 serves to accelerate the friction wheel 31 and replaces the motor 4a of FIGURE 1a. Thus, the double lever 47 is pivotally connected to link 49 and the bell crank 50 which is rotatably mounted on the fixed axis 51. An extending leg of bell crank 50 is then pivotally connected to the outwardly extending shaft of piston 52 which is movable within the cylinder 53.

The second terminal of the circuit interupter of FIGURE 2 is then formed of a hollow conductor 54 which is connectable to a suitable source of high pressure gas through a suitable valve means, not shown, thereby to place pressure against the right-hand surface of piston 52 to move piston 52 to the left. This will take place immediately prior to the desired circuit operation.

Openings 73, 74 and 75 are further provided to admit high pressure extinguishing gas such as sulphur hexafluoride into the various sealed chambers into which these openings lead. Note that the pressure of the gas applied to conduit 52 must be higher than the pressure of the extinction gas on the high pressure side of the switch chamber.

In order to control the pawl operation of the pawls 36 and 37, an electrical control system is provided which includes the current transformer 55, an air gap transformer 56 and a magnet 57. Sliding electrical windings 58 which surround the axis 59 are contained within the air gap of air gap transformer 56, and the sliding coil 58 is connected to the lever 60.

Electrical control systems of this general type are shown in greater detail in copending application Ser. No. 403,541, filed Oct. 13, 1964, in the name of Otto Jensen, entitled Synchronous Circuit Breaker Having A Movable Winding and assigned to the assignee of the instant invention.

A pre-release system 61 is then provided which has a magnetic yoke 62 which has an armature 63 which is biased away from the magnetic yoke by means of a suitable biasing spring 64. A winding 65 is then placed upon the yoke 62, and the terminals of the winding 65 are connected to the secondary winding (not shown) of the current transformer 55. The winding 66 is then connected to the secondary winding of air gap transformer 56. A second secondary winding 67 of the air gap transformer 56 is then connected to the ends or terminals of the sliding coil 58 by some suitable flexible wiring which will permit the movement of the sliding coils.

It will be noted that the pre-release system is of the type disclosed in more detail in copending application Ser. No. 441,616, filed Mar. 22, 1965, in the name of Lutz Segun, entitled Magnetic Current Zero Sensing Circuit and assigned to the assignee of the present invention.

In order to release the armature 63, a lug 68 on the crank 50 is provided which cooperates with a leaf spring 69.

The operation of this system of FIGURE 2 is described as follows in conjunction with the diagram of FIGURE 3:

High pressure is first applied to conduit 54, thereby moving piston 52 rapidly to the right. This causes crank 50 to rotate in a counterclockwise direction about its pivot 51, thereby pulling link 49 downwardly with great speed, whereupon the pawl 48 suspended from levers 47 engages the surface of the friction wheel 31 and causes the initiation of rotation of the friction wheel 31. With systems of the type shown in FIGURE 2, it has been found that the wheel 31 can be brought to angular velocities of 300 r.p.m. in 3 to 5 milliseconds. After the end of this stroke, the lever 49 and its pawl 48, along with cylinder 52, will return to their originial position when the gas pressure of conduit 54 is descreased. Thus, the starting system will be prepared for the next required acceleration of the friction wheel.

At the end of this accelerating process and rotation of crank arm 50, the lift spring 69 is engaged by lug 68 of crank 50, and is pressed downwardly, thus causing the release of armature 63 of the pre-release system 61. Note that if the system is a relatively low current system, or low currents are to be interrupted, then the armature 63 under the action of spring 64 may be immediately released when the blocking pawl 36 is tripped. Under relatively high voltage conditions, the armature 63 could drop out, for examples, 1.5 milliseconds prior to zero current passage through the contacts to be operated so that a synchronous braking can occur. If contact interruption occurs at zero current passage, the switch will remain in its open position.

However, if for any reason, synchronous operation or current interruption prior to zero current passage does not take place, then the sliding coil 58 will move in the direction of the arrow shown about axis 59, whereby the locking pawl 37 will be tripped to cause the immediate reclosing of the contacts.

Note that by using a friction wheel as contrasted to a wheel having a toothed outer periphery which cooperates with a cooperating tooth, very low control force for rotation of the locking pawls 36 and 37 is required to result in very large acceleration forces of the movable contact.

While the system will work properly with or without the wedge-shape of the friction wheel, the wedge-shape permits greater engagement forces between the wheel and the locking pawl. In particular, the rolling pressure K should be rated in the range of 4 to 8 kp./mm.² where K is equal to $$K = \frac{F_n}{2r_0 b}$$

where $F_n$ is the normal force of the pawl engaging the wheel, and $r_0$ is the radius of curvature of the wedge cutout 32, and $b$ is the length of the contacts between the friction wheel and the engaging pawl.

The complete assembly shown in FIGURE 2 can be suitably contained within an insulation housing 70 which is enclosed by end caps 71 and 72. Manual operation of the system may occur through suitable mechanical lever means, or pneumatic or hydraulic systems, which cause the arresting pawls 36 and 37 to momentarily engage friction wheel 31.

Since the complete system is mounted within the housing 70, the housing 70 may be connected directly between terminals of the circuit to be interrupted, whereby the intake and outlet openings, marked by arrows in FIGURE 2, are connected to a suitable compressor through insulation tubing with a compressed air container provided for the supply of high pressure gas which permits smaller dimensions for the unit, particularly in high voltage systems.

Figure 3:
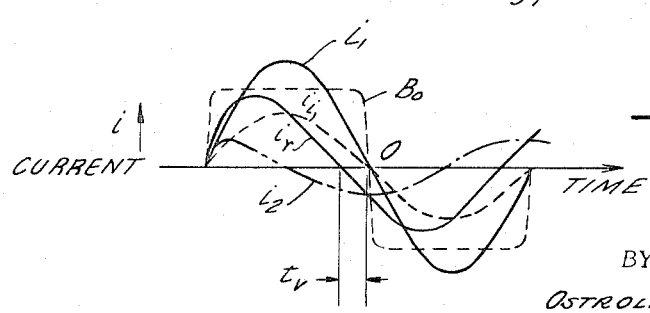
FIGURE 3 illustrates various currents in FIGURE 2 as a function of time.

The operation of the pre-release system 61 and the sliding coil systems 57, 58 may be understood from FIGURE 3. Referring now to FIGURE 3, current $i_1$ is the current which is to be interrupted; current $i_1'$ is the secondary current of current transformer 55; current $i_2$ is the secondary current of air gap transformer 56, and is in quadrature with relation to the current $i_1$.

The two currents $i_1$ and $i_2$ then activate the magnetic system 61 and produce a resulting magnetization corresponding to the current $i_r$, shown in FIGURE 3, which by the pre-release time $t_v$ goes through zero before the zero passage of the current $i_1$. Shortly before the current $i_r$ reaches zero, the armature 63 is released to achieve the synchronous breaking desired.

In the magnetic circuit 57, which is excited by current $i_1$, the circuit has only one air gap in which the sliding coil 58 will move and causes an approximately rectangularly shaped induction characteristic $B_0$, while the current $i_2$ flows through the sliding coil 58.

As has been described in the above noted copending application Ser. No. 403,541, this produces a force according to the equation $$F = lB_0 i_2$$

where $l$ is the effective length of the sliding coil.

It can now be seen from FIGURE 3 that from the moment of the peak current of current $i_1$ to the zero passage of current $i_1$ the product $B_0 i_2$ is negative. The slidcoil 58 will be pressed against a rigid stop and remains in place if final contact separation occurs at point zero in FIGURE 3. If, however, the current $i_1$, for any reason continued to flow, then the force applied to sliding coil 58 will be momentarily changed, since the current $i_2$ as well as the induction $B_0$ in the air gap will be negative, so that the product $B_0 i_2$ will be positive.

Thus, the sliding coil, by means of the force F, will be pulled upward and in the direction of the arrow in FIGURE 2 to effect the tripping of the arresting pawl 37, thereby to cause immediate reclosing of the system.

It has been found that for voltages up to approximately 100 kilovolts, this point of interruption can be further controlled by the use of sulphur hexafluoride which is at a pressure of approximately 15 atmospheres. At still higher voltages it is advantageous to provide series connected breaks, each of which may be identical to that shown in FIGURES 1 and 2.

A typical series connected break system which incorporates the concepts of the invention is schematically illustrated in FIGURE 4. Referring now to FIGURE 4, a rotating friction wheel 81 is provided with the double lever system of levers 82 and 83 which are connected at their ends to the pawls 84 and 85. A first lever system including levers 86, 87, 88 and 89 are then connected to operate the contact rod 90 in the manner described for FIGURES 1 and 2, whereby the movable contact 91 is suitably moved with respect to the stationary contact structure 91a.

To convert this system to the two-break arrangement, however, additional links 92 and 93 can be added which are pivotally connected to the levers or links 82 and 83 and with bridge 94. The bridge or bridging link 94 then carries the movable contact rod 95 which is terminated with the movable contact 96 which cooperates with a stationary contact 96a.

In operation, and upon tripping of pawl 84 it will be clear that a dual break will take place between contacts 91 and 91a and contacts 96 and 96a which may be connected in series with the circuit to be protected. Similarly, and upon tripping of pawl 85, closing of both contact sets will take place.

As seen in FIGURE 4, only two magnetic systems 97 and 98 are necessary for the control of the two series connected sets of contacts where the magnet system 97 effects the asynchronous or synchronous contact separation, while magnet system 98 effects the reclosing operation.

Thus, the additional expense required for the double interruption structure or double break arrangement is negligible.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination, a circuit interrupter structure including a switch contact movable between an engaged and disengaged position with respect to a cooperating contact and a synchronous operating mechanism; said operating mechanism including a rotatable wheel having a generally smooth outer periphery, means connected to said wheel for rotating said wheel, a pawl movably mounted with respect to the periphery of said wheel and movable into frictional engagement with the outer peripheral surface of said wheel, and link means connecting said pawl to said contact whereby connection of said pawl to said surface operatively connects said wheel to said movable contact.

2. The device substantially as set forth in claim 1 which includes a second pawl movably mounted with respect to the periphery of said wheel and movable into frictional engagement with said outer periphery of said wheel; said second pawl disposed on the side of said wheel opposite to said pawl; and second link means connecting said second pawl to said contact.

3. The device substantially as set forth in claim 2 wherein said pawl and second pawl and said switch contact are constrained to generally straight line translatory movement in a common direction; each of said pawl and second pawl rotatably mounted and rotatable into engagement with the said periphery of said wheel.

4. The device substantially as set forth in claim 2 wherein said link means includes first and second levers, means pivotally mounting each of said first and second levers coaxially with the axis of rotation of said wheel; said pawl and second pawl rotatably mounted on the opposite ends of said first and second levers, respectively.

5. The device substantially as set forth in claim 4 which further includes magnetic pawl operating means for selectively rotating said pawl and second pawl into engament with said periphery of said wheel.

6. The device substantially as set forth in claim 5 wherein the angular momentum of said wheel is sufficient to cause at least ten operations of said switch contact.

7. The device substantially as set forth in claim 4 wherein said means for rotating said wheel includes a third lever means pivotally mounted at one end on the axis of rotation of said wheel and having a third pawl pivotally mounted on the opposite end thereof; said third pawl biased into engagement with said periphery of said wheel; and means for rotating said third lever in a direction about said axis whereby said third pawl drives said wheel.

8. The device substantially as set forth in claim 1 wherein the periphery of said wheel is concave in section; said pawl having a convex engaging surface nesting into said concave periphery.

References Cited

UNITED STATES PATENTS 2,042,915   6/1936   Twist.
3,284,732  11/1966  Kesselring _____ 335—24

BERNARD A. GILHEANY, *Primary Examiner.*

R. N. ENVALL, JR., *Assistant Examiner.*

UNITED STATES PATENT OFFICE

CERTIFICATE OF CORRECTION

Patent No. 3,337,827                                      August 22, 1967

Fritz Kesselring

It is certified that error appears in the above identified patent and that said Letters Patent are hereby corrected as shown below:

Column 2, line 67, "7" should read -- 8 --. Column 3, line 58, "15" should read -- 5 --. Column 5, line 64, "right" should read -- left --; line 73, "cylinder" should read -- piston --.

Signed and sealed this 17th day of February 1970.

(SEAL)
Attest:

Edward M. Fletcher, Jr.                             WILLIAM E. SCHUYLER, JR.
Attesting Officer                                         Commissioner of Patents